(12) United States Patent
Lemonde et al.

(10) Patent No.: US 8,483,477 B2
(45) Date of Patent: Jul. 9, 2013

(54) METHOD OF CONSTRUCTING A DIGITAL IMAGE OF A THREE-DIMENSIONAL (3D) SURFACE USING A MASK

(75) Inventors: Vincent Lemonde, Noomeo (FR); Ludovic Brethes, Noomeo (FR)

(73) Assignee: NOOMEO, Labege (FR)

( * ) Notice: Subject to any disclaimer, the term of this patent is extended or adjusted under 35 U.S.C. 154(b) by 107 days.

(21) Appl. No.: 12/680,557

(22) PCT Filed: Sep. 26, 2008

(86) PCT No.: PCT/FR2008/001340
§ 371 (c)(1),
(2), (4) Date: May 13, 2010

(87) PCT Pub. No.: WO2009/074751
PCT Pub. Date: Jun. 18, 2009

(65) Prior Publication Data
US 2011/0170767 A1 Jul. 14, 2011

(30) Foreign Application Priority Data
Sep. 28, 2007 (FR) .................................... 07 06822

(51) Int. Cl.
*G06K 9/00* (2006.01)
(52) U.S. Cl.
USPC ....................................................... 382/154
(58) Field of Classification Search
USPC ...................... 382/154; 345/419, 427; 356/12
See application file for complete search history.

(56) References Cited

U.S. PATENT DOCUMENTS

| | | | |
|---|---|---|---|
| 5,003,166 A | 3/1991 | Girod | |
| 5,835,241 A | 11/1998 | Saund | |
| 6,377,353 B1 | 4/2002 | Ellis | |
| 6,549,289 B1 | 4/2003 | Ellis | |
| 8,050,461 B2 * | 11/2011 | Shpunt et al. | 382/106 |
| 2005/0116952 A1 | 6/2005 | Je et al. | |
| 2006/0017720 A1 | 1/2006 | Li | |
| 2006/0083422 A1 | 4/2006 | Ernst et al. | |
| 2006/0120576 A1 | 6/2006 | Chen | |
| 2007/0216894 A1 | 9/2007 | Garcia et al. | |

FOREIGN PATENT DOCUMENTS

| | | |
|---|---|---|
| FR | 2 842 591 A1 | 1/2004 |
| GB | 2 410 794 A | 8/2005 |
| WO | 2007/043036 A1 | 4/2007 |
| WO | 2007/105205 A2 | 9/2007 |
| WO | 2007/105215 A2 | 9/2007 |

* cited by examiner

*Primary Examiner* — Edward Park
(74) *Attorney, Agent, or Firm* — Sughrue Mion, PLLC

(57) ABSTRACT

A method for constructing a digital image of a three-dimensional surface of a physical object includes choosing a surface on the object and placing a projector equipped with a light source to face the object, and providing a mask defining a speckle pattern having a multitude of points with predetermined light intensities and/or colors. The optical axis of the projector is directed towards the surface to be imaged. The speckle pattern is projected, along the optical axis, onto the surface. A two-dimensional image of the speckle pattern is acquired and stored and deformed by an optical sensor disposed in the optical axis. The image of the deformed speckle pattern is compared with an image of the non-deformed speckle pattern, and then, for each point of the selection, at least the depth coordinate is calculated.

5 Claims, 14 Drawing Sheets

METHOD OF CONSTRUCTING A DIGITAL IMAGE OF A THREE-DIMENSIONAL (3D) SURFACE USING A MASK

CROSS REFERENCE TO RELATED APPLICATIONS

This application is a National Stage of International Application No. PCT/FR2008/001340 filed Sep. 26, 2008, claiming priority based on French Patent Application No. 07/06822 filed Sep. 28, 2007, the contents of all of which are incorporated herein by reference in their entirety.

The invention relates to the contactless construction of digital images from three-dimensional physical objects. This technique is commonly called three-dimensional, or 3D, scanning or imaging.

The need to produce digital images of real objects is becoming apparent in many industrial sectors, starting with product designers where the analysis of competitor products, commonly referred to as "reverse engineering", together with the sharing and the storage of information relating to these products, is becoming indispensible particularly in view of the general expectations for innovation and the rate of renewal of products. These sectors are not the only ones concerned: biometry, medicine (surgery in particular) and industrial husbandry (see the documents cited hereinbelow) are making increasing use of 3D imaging.

Old-fashioned techniques consisted of dismantling the products and making pencil drawings, or of using contact metrology tools. These methods, which were long and tedious, have evolved over time with the advent of techniques for computer-aided design/drafting (CAD), which enable design and three-dimensional display of objects during the design process. Some more comprehensive tools offer a direct link with the manufacturing process (CAD/CAM). Fast-turn-around prototyping solutions have most recently appeared in conjunction with the CAD tools.

It goes without saying that a 3D imaging tool, linked with a CAD tool, allows a considerable amount of time to be saved. Such a tool generally comprises one or more scanners, portable or otherwise, performing an acquisition of the topography of the object in one or more orientations, this topography then being used to carry out a three-dimensional digital reconstruction of the object within the CAD environment.

There exist several techniques for contactless acquisition. Generally speaking, these techniques are based on the projection onto the object of a light image having a given shape (line, repeating pattern, etc.) whose distortion, visually captured and analyzed point by point (with a given definition or resolution), allows three-dimensional, and notably depth, coordinates to be calculated for each point.

These techniques may be classified into two broad families:

scanning, which consists in projecting a linear image onto the object (generally a thin plane light beam generated by means of a laser source) and in scanning the surface of the object by means of this line whose successive distortions enable a progressive reconstruction of the entirety of the illuminated face, and instantaneous capture or "one-shot", which consists in projecting onto the object, at one point in time, a structured image containing a predetermined pattern whose general distortion, with respect to its projection onto a plane, is analyzed point by point in order to allow the illuminated face to be reconstructed.

These two techniques perform the acquisition of the distorted image by means of an image capture device (still camera or cine/video camera) directed towards the illuminated face of the object, this device itself being connected to a 3D image analysis and reconstruction device (generally in the form of a reconstruction software module associated with a CAD software module, implemented on a computer processor).

The patent publications EP 0 840 880 (Crampton) and U.S. Pat. No. 5,835,241 (Xerox) both illustrate the scanning technique. This technique has the advantage of being accurate, but it nevertheless takes time (several seconds for each scan) and requires the object to be perfectly still for the entire projection time. It is easy to understand why this technique can be difficult to apply to biometry (except to limited parts of the human body). Moreover, the use of the laser is problematic, and may even turn out to be dangerous if it is to be used for scanning the human face.

For this reason, the one-shot technique would currently seem to be the most promising, owing to the speed with which the acquisition can be carried out and to the fewer constraints relying on the immobilization of the object, which can (if its size and its weight allow it) simply be held in the hand. In order to illustrate this technique, reference could notably be made to the patent publications US 2005/0116952 (Je et al.), U.S. Pat. No. 6,549,289 (Pheno Imaging), U.S. Pat. No. 6,377,353 (Pheno Imaging), GB 2 410 794 (Sheffield Hallam University), U.S. 2006/0120576 (Biomagnetic Imaging), and U.S. 2006/0017720 (Li).

However, the known techniques (including those of the one-shot) cannot be used without certain drawbacks.

Firstly, the dispersion of the projection and acquisition tools does not allow scanners to be made sufficiently compact and light to allow true portability, so that, even for imaging an object of limited size (such as a telephone), a whole paraphernalia needs to be disposed around the object.

Secondly, the calculations carried out on the images coming from the acquisition are generally complex (see in particular the aforementioned document US 2006/0017720), requiring cumbersome programs implemented on powerful processors.

The invention notably aims to overcome the aforementioned drawbacks by providing a technical solution allowing the 3D imaging of an object to be carried out in a simple and quick manner.

For this purpose, the invention provides a method for constructing a digital image of a three-dimensional surface of a physical object, this method comprising the operations consisting in:

choosing a surface on the object;

placing, facing said surface, a projector equipped with a light source, an optical axis, and a mask defining a speckle pattern comprising a multitude of points with predetermined light intensities and/or colors, directing the optical axis of the projector towards the surface to be imaged, projecting, along the optical axis, the speckle pattern onto the surface, acquiring and storing a two-dimensional image of the speckle pattern projected onto the surface and deformed by the latter, by means of an optical sensor disposed in the optical axis of the projector, comparing, for at least a selection of points from the speckle pattern, the image of the deformed speckle pattern with an image of the non-deformed speckle pattern, as projected onto a reference plane, calculating, for each point of the selection, at least the depth coordinate, measured parallel to the optical axis, of the projection of this point on the surface.

Other objects and advantages of the invention will become apparent in the light of the description presented hereinafter with reference to the appended drawings in which.

Figure 1:
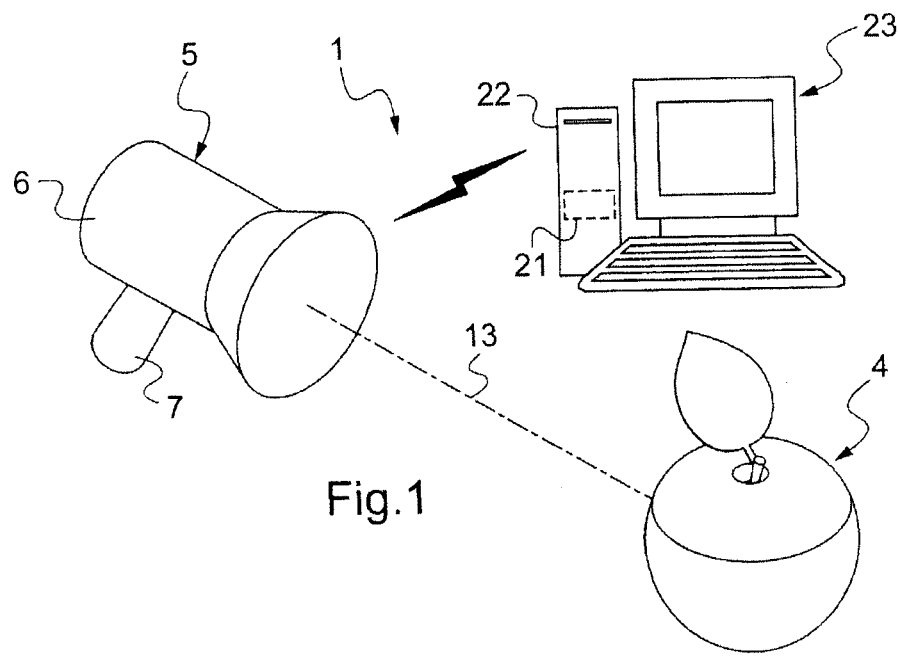
FIG. 1 is a three-dimensional view of a 3D imaging device applied to the sensing of a physical object, in this case an apple.
Figure 2:
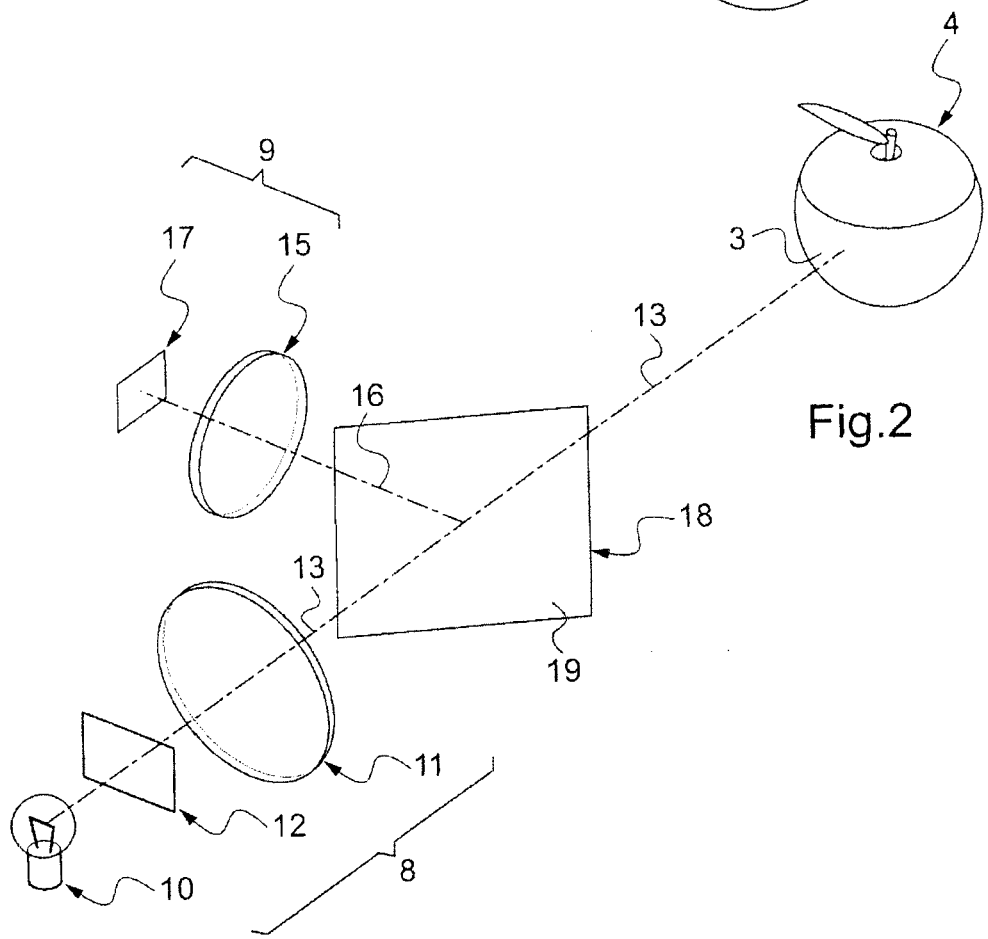
FIG. 2 is an exploded perspective view of the device in FIG. 1, showing a part of its internal components from another viewing angle.
Figure 3:
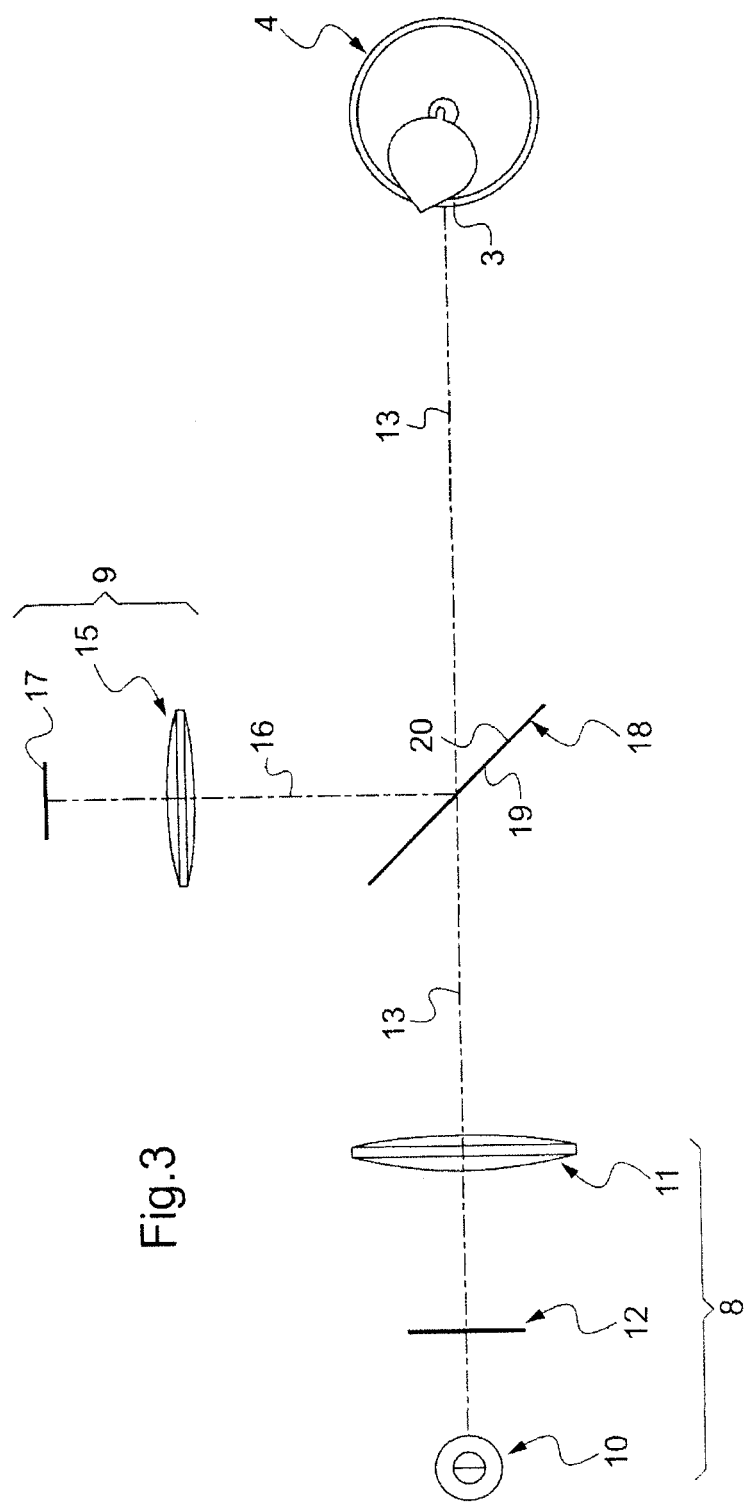
FIG. 3 is a top view of the device in FIG. 2.

In FIGS. 1 to 3, a contactless imaging device 1 is shown schematically that allows a digital image 2 of a three-dimensional surface 3 of a physical object 4 to be constructed. In the views of FIGS. 1 to 3, this object 4 is an apple, but it could be any other object having one or more three-dimensional surfaces to be imaged, where these surfaces can exhibit relief (in other words be non-planar).

This device 1 comprises an apparatus 5 comprising a portable housing 6 equipped with a handle 7 for holding and carrying it and, mounted within this housing 6, a projector 8 and an image capture device 9 of the cine/video camera type (in other words being able to acquire images continuously, for example at the standard rate of 24 images per second), or of the still camera type (in other words taking instantaneous photographs). It will be assumed in the following description that the image capture device 9 is a cine/video camera, which may be employed, as needs be, as a still camera.

As can be seen in FIGS. 2 and 3, the projector 8 comprises a light source 10 and, disposed in front of this light source 10, focusing optics 11 and a mask 12.

The light source 10 is preferably a source of white light, for example of the filament type (as in the schematic example shown in FIGS. 2 and 3) or of the halogen type.

The focusing optics 11, schematically represented in FIGS. 2 and 3 by a simple converging lens, defines a main optical axis 13 passing through the light source 10.

The mask 12 defines a speckle pattern 14 comprising a multitude of points with predetermined light intensities (contrast) and/or colors. Such a speckle pattern 14 is shown in plan view in FIG. 6: for a definition of speckle pattern, cf. for example Juliette SELB, "*Source virtuelle acousto-optique pour l'imagerie des milieux diffusants*" [Acousto-optical virtual source for the imaging of scattering media], Doctoral thesis, Paris XI, 2002). In practice, the mask 12 can take the form of a translucent or transparent plate (glass or plastic), square or rectangular, of the photographic slide type, onto which the speckle pattern 14 is printed by a conventional process (transfer, offset, silkscreen, flexography, laser, inkjet, etc.). The mask 12 is disposed between the light source 10 and the optics 11, on the axis 13 of the latter, in other words perpendicularly to the optical axis 13 and such that the latter passes through the center of the mask 12 (in this case defined by the crossing point of its diagonals). The mask 12 is placed at a predetermined distance from the optics 11, depending on the focal length of the latter (see the example hereinbelow).

Two of the adjacent sides of the mask 12 respectively define an abscissa axis (x) and an ordinate axis (y), the optical axis defining a depth axis (z).

The camera 9 comprises a set of optics 15, schematically represented in FIGS. 2 and 3 by a simple converging lens, and defining a secondary optical axis 16.

The camera 9 also comprises a photosensitive sensor 17, for example of the CCD type, which takes the form of a square or rectangular plate and is placed, in front of the optics 15, on the secondary optical axis 16, in other words perpendicularly to the latter and such that the axis passes through the center of the sensor 17 (in this case defined by the crossing point of its diagonals). The sensor 17 is placed at a predetermined distance from the optics 15, depending on the focal length of the latter (see the example hereinbelow).

As can be seen in FIGS. 2 and 3, the projector 8 and the camera 9 are disposed in such a manner that the optical axes 13 and 16 are coplanar and perpendicular.

The apparatus 5 also comprises a semi-reflecting mirror 18 disposed on the main optical axis 13 at the intersection with the secondary optical axis 16. More precisely, the mirror 18 has two opposing plane main faces, namely a rear face 19, disposed facing the projector 8, and a front face 20, disposed facing the camera 9.

In the example illustrated, the semi-reflecting mirror 18 takes the form of a thin slide whose faces 19 and 20 are parallel, but it could take the form of a prism whose faces would be inclined at 45° with respect to one another.

The rear face 19, in this case inclined at an angle of 45° with respect to the main optical axis 13, is configured for transmitting, along the optical axis 13, the incident light coming from the projector 8.

As regards the front face 20, this lies in a plane inclined at an angle of 45° with respect to the main optical axis 13 and to the secondary optical axis 16 (in other words in a plane perpendicular to the plane formed by the axes 13 and 16, and containing the bisector of the right angle formed by the latter). This front face 20 is semi-reflecting, in other words it is configured for transmitting along the main optical axis 13 the incident light coming from the projector 8, but for reflecting along the secondary optical axis 16 the reflected light coming to it along the main optical axis 13 from the illuminated object 4.

The mirror 18 is disposed in such a manner that the main axis 13 and secondary axis 16 intersect on the semi-reflecting front face 20 (also referred to as beam-splitter), and more precisely at the center of the latter (in this case defined by the crossing of its diagonals).

Thus, the incident light emitted by the source 10 firstly passes through the mask 12, is focused by the optics 11 then passes through the semi-reflecting mirror 18 without being reflected. This light illuminates—with projection of the mask 12—the object 4 to be imaged, which reflects a part of it which, being emitted along the main optical axis 13 in the opposite direction to the incident light, is reflected at a right angle, along the secondary optical axis 16, by the beam-splitter 20 in the direction of the camera 9. This reflected light is focused by the optics 15 of the camera 9 and finally hits the sensor 17.

Thanks to this arrangement, the secondary optical axis 16 is virtually the same as the main optical axis 13. In other words, although the camera 9 is not physically located on the main optical axis 13, it is situated within the main optical axis 13, in the sense that everything happens as if the light reflected by the object 4 and hitting the sensor 17 had not undergone any deviation.

The interposition of a semi-reflecting mirror 18, in practice, avoids the obscuring of the projector 8 that the physical installation of the camera 9 on the main optical axis 13 in front of the projector 8 would cause or, vice versa, the obscuring of the camera 9 that installing it on the main optical axis 13 behind the projector 8 would cause.

Figure 8:
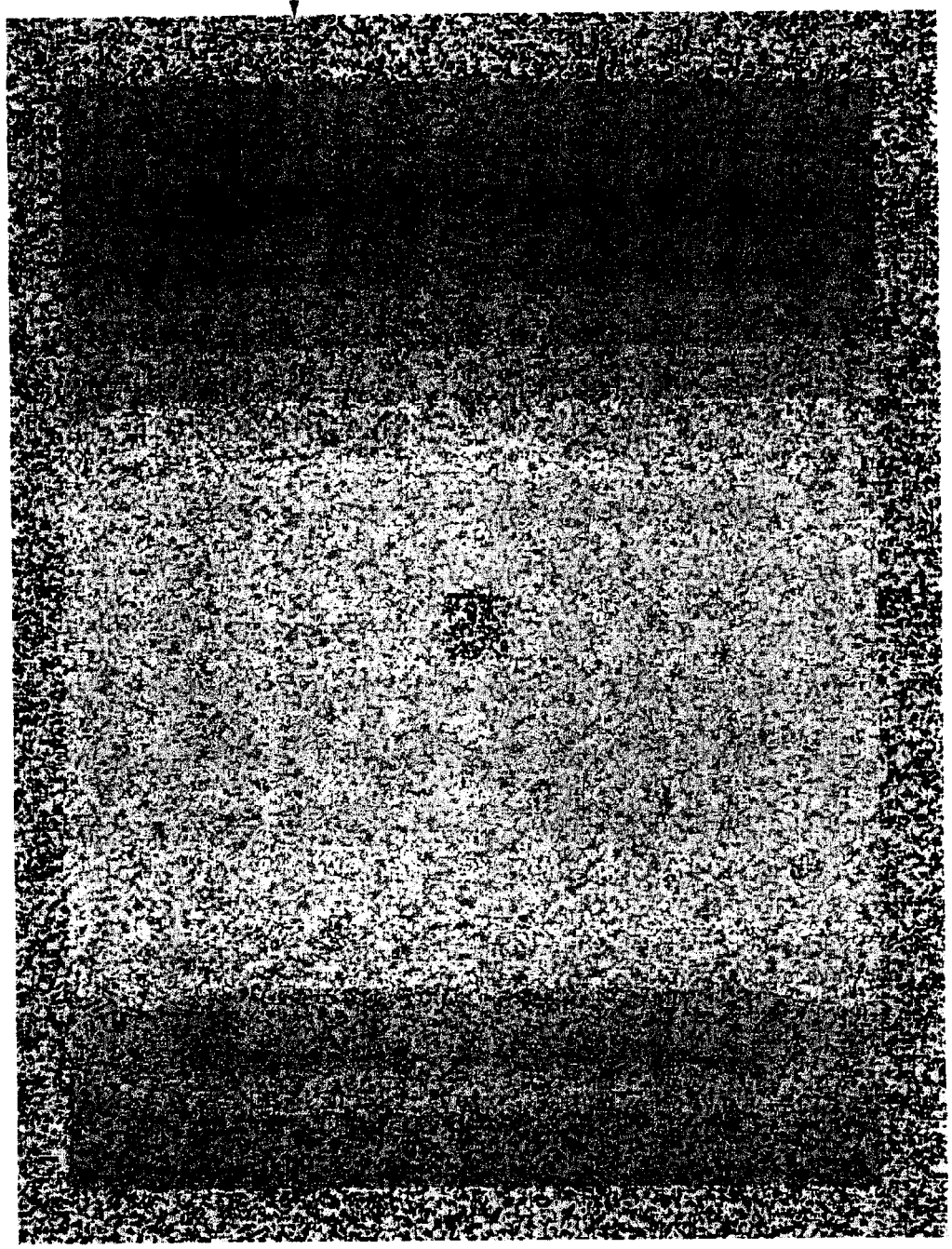
FIGS. 8, 9 and 10 illustrate the analysis of the distortion of the speckle pattern along three orthogonal axes of three-dimensional space, in abscissa, in ordinate and in depth, respectively.
Figure 9:
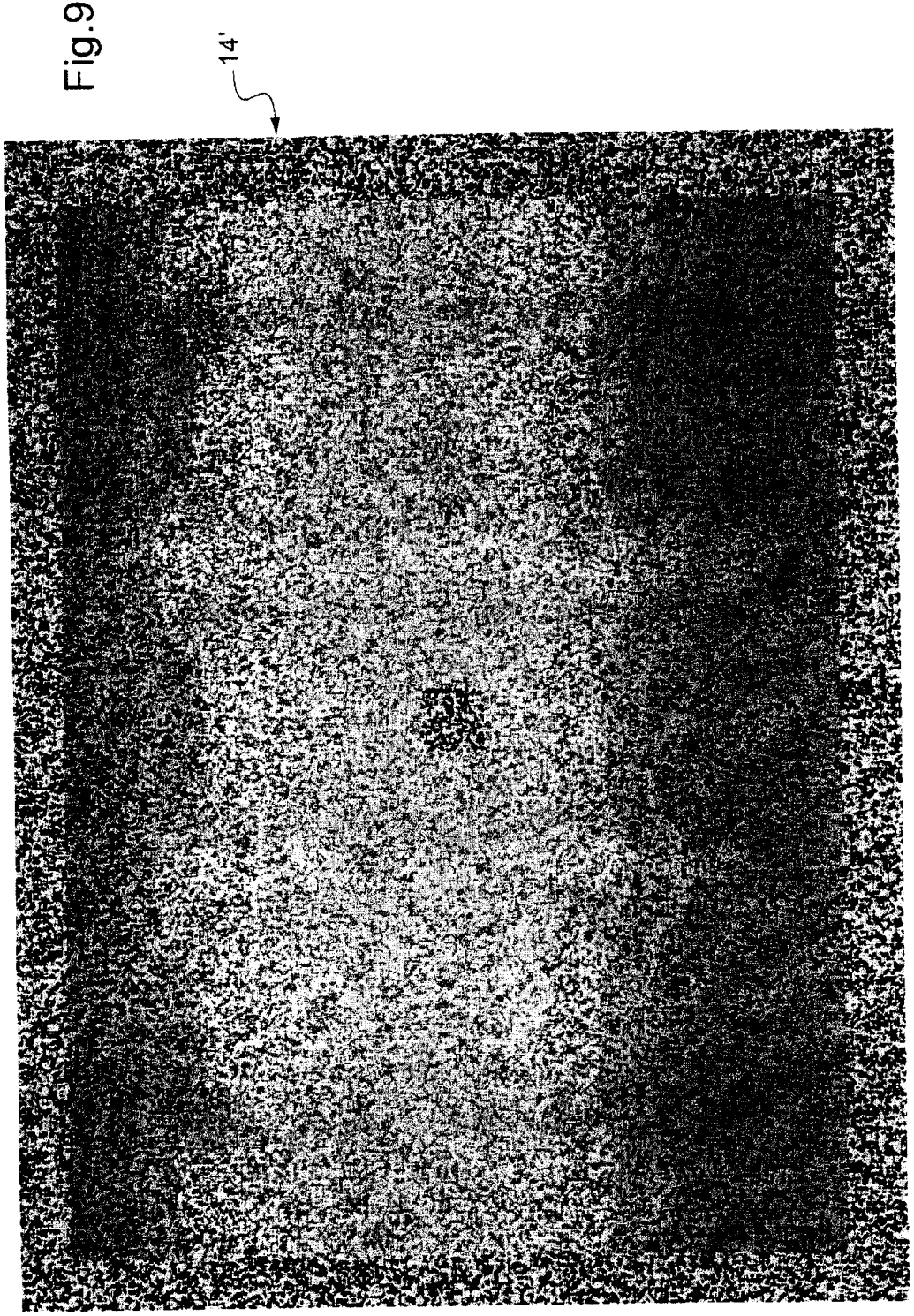
Figure 10:
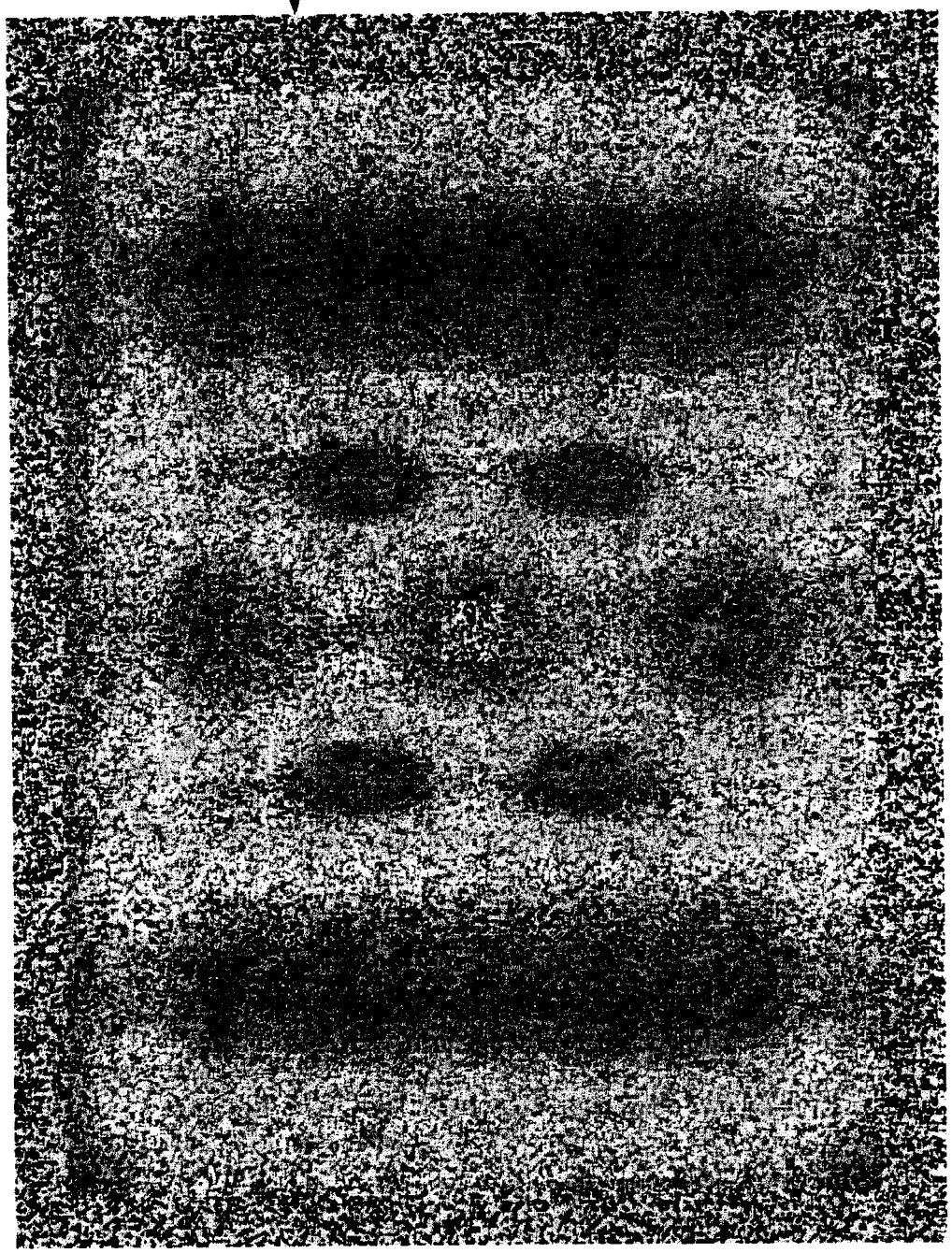
Figure 11:
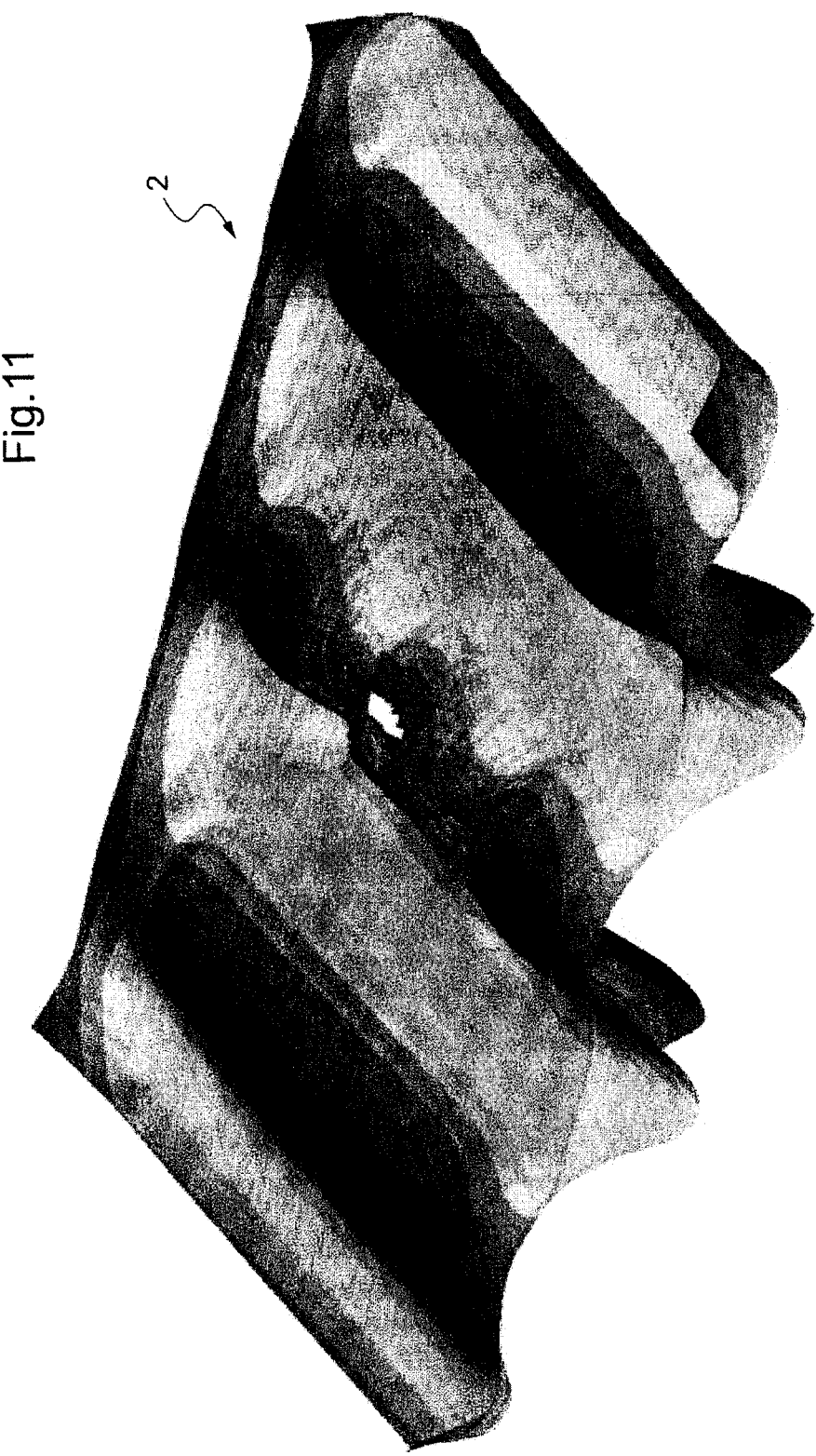
FIGS. 11 and 12 are perspective views, from the front and from the rear, respectively, of the illuminated front face of the object in FIG. 6, as reconstructed from the analysis illustrated in FIGS. 8 to 10.
Figure 12:
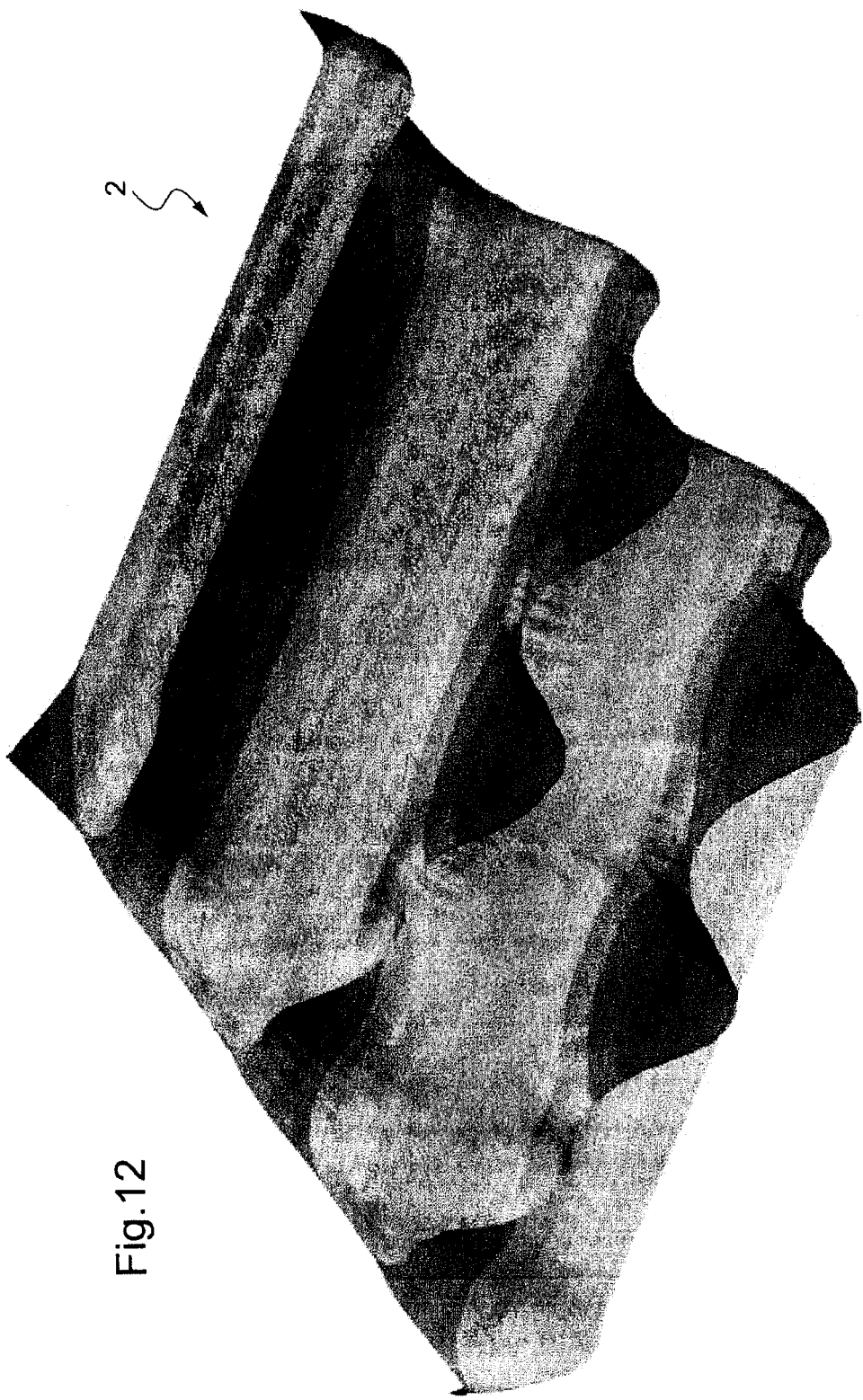
Figure 13:
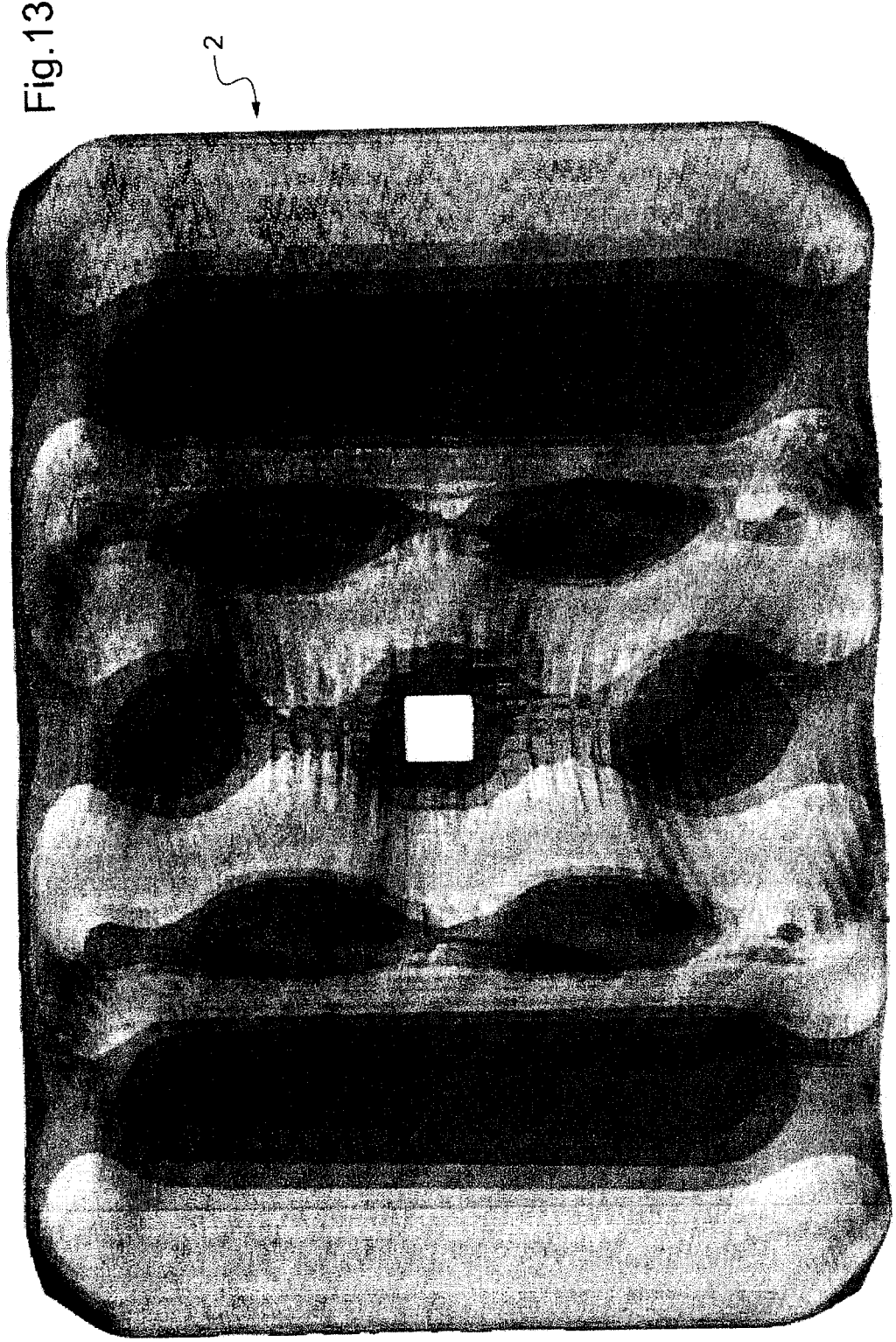
FIG. 13 is a plan view of the illuminated front face of the object in FIG. 6, as reconstructed.
Figure 14:
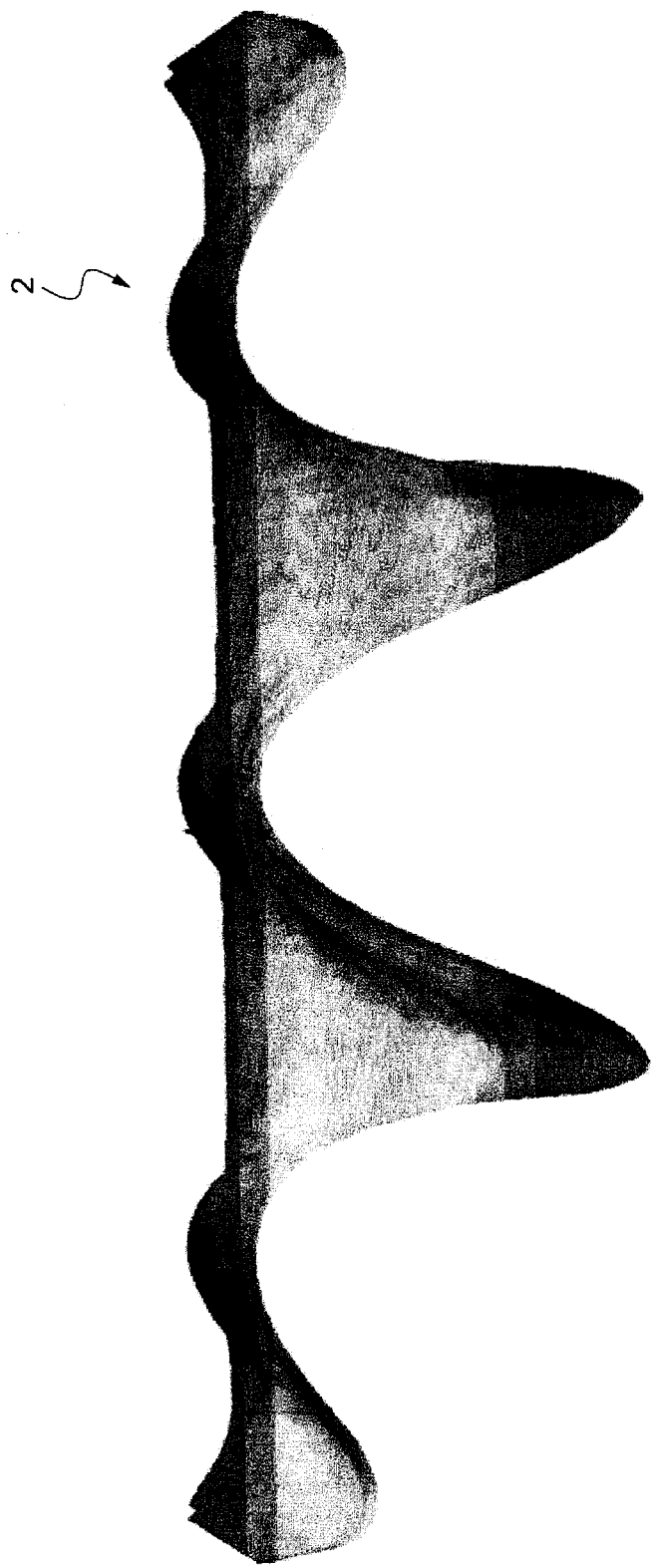
FIGS. 14 and 15 are side views, in two different orientations, of the illuminated front face of the object in FIG. 6.
Figure 15:
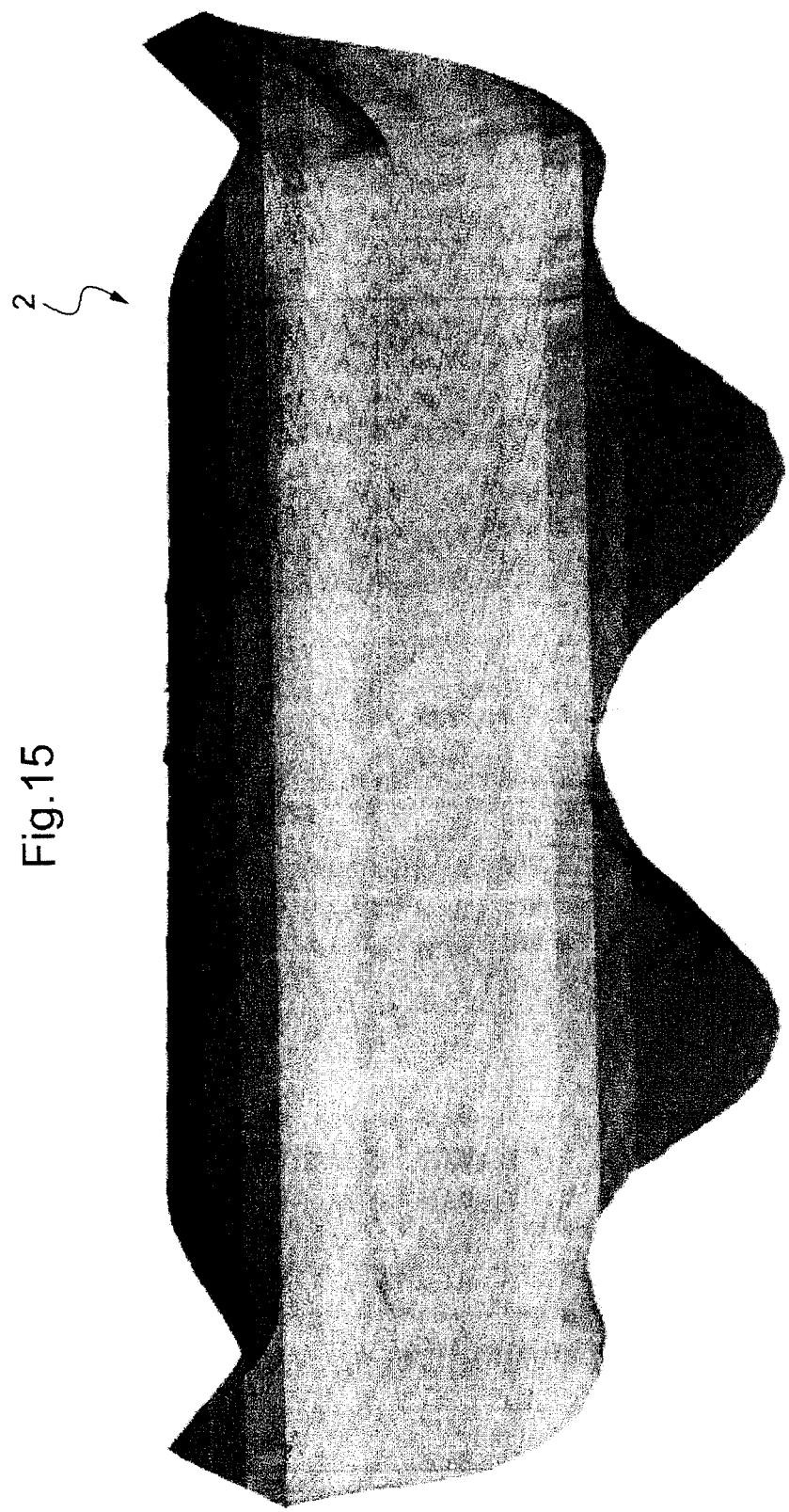

According to one preferred embodiment, illustrated in FIGS. 2 and 3, the distance from the sensor 17 to the beam-splitter 20 is less than the distance from the mask 12 to the beam-splitter 20. In other words, virtually speaking, the camera 9 is placed in the main optical axis 13 in front of the projector 8. This allows a sensor 17 of a reasonable size (and therefore of reasonable cost) to be used, whose field of view is strictly included in the image of the speckle pattern 14, as can be seen in FIGS. 8 to 10.

Hereinafter, an experimental example of design dimensions of the projector 8 and of the camera 9 is provided:

Projector:

| Parameter | Preferred range | Preferred value |
|---|---|---|
| large dimension of the mask 12 | 10 mm-15 mm | 12 mm |
| Focal length of the optics 11 | 10 mm-15 mm | 12 mm |
| distance mask 12 - optics 11 | 10 mm-15 mm | 12.4 mm |
| distance mask 12 - beam-splitter 20 | 100 mm-150 mm | 13.5 mm |
| Magnification | 20-40 | 30 |

Camera:

| Parameter | Preferred range | Preferred value |
|---|---|---|
| large dimension of the sensor 17 | 3 mm-7 mm | 5.4 mm |
| Focal length | 3 mm-9 mm | 6 mm |
| distance sensor 17 - optics 15 | 4 mm-8 mm | 6.11 mm |
| distance sensor 17 - beam-splitter 20 | 60 mm-100 mm | 85 mm |
| Magnification | 0.005-0.030 | 0.018 |

Figure 5:
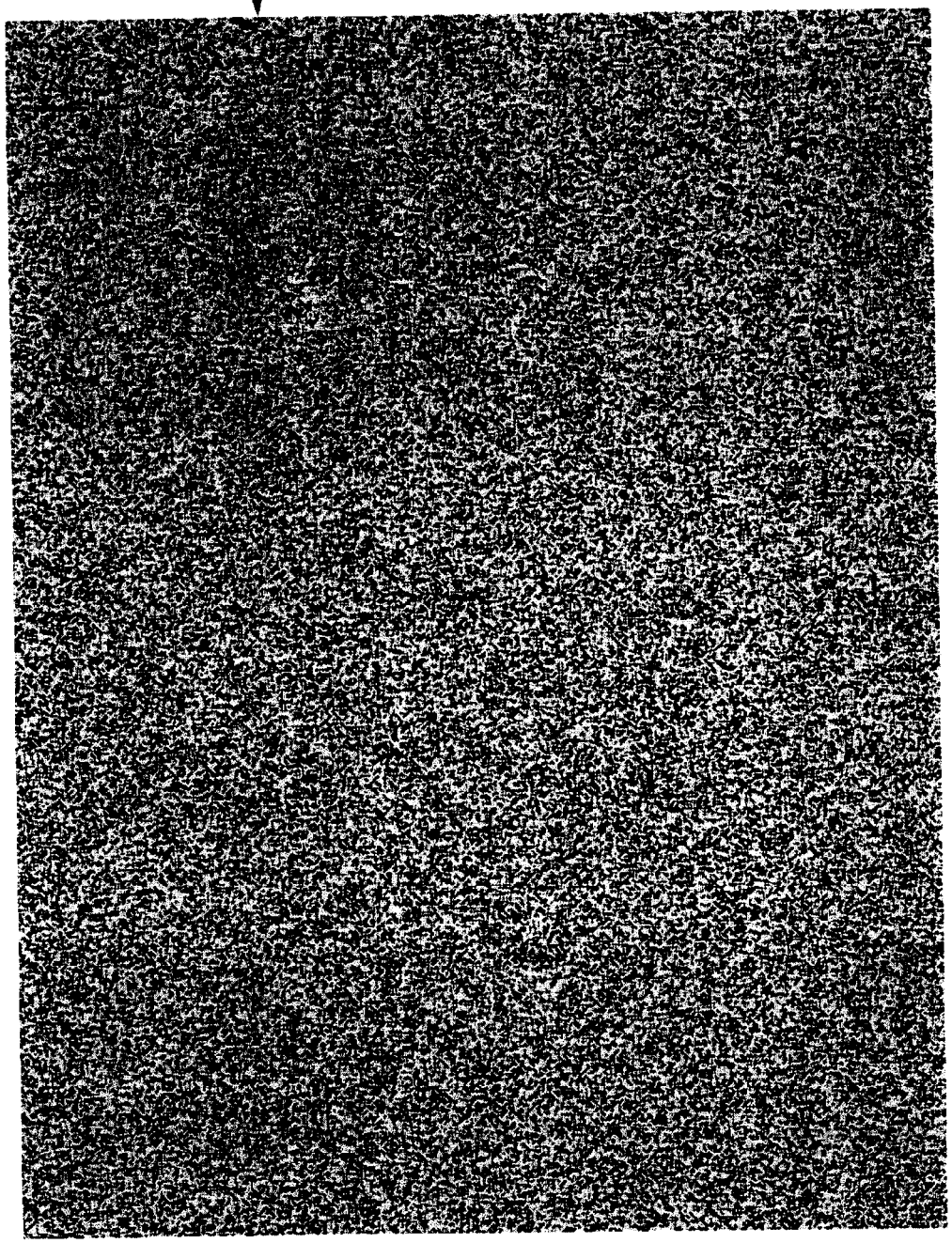
FIG. 5 is a plan view of a light speckle pattern, as projected onto a reference plane perpendicular to the axis of projection.

The preferred design values (cf. column "preferred value"), allows a sharp image of the speckle pattern 14 (FIG. 5), whose large dimension measures around 350 mm, to be projected onto a target plane Γ (reference plane) situated at 390 mm from the mask 12, the sensor 17 being capable of viewing within this image a field whose large dimension measures around 300 mm.

The apparatus 5 furthermore comprises a manual trigger mechanism (for example of the pistol trigger type) which can be mounted on the handle 6 and which allows the projector 8 and the camera 9, in other words the projection of the mask and the image capture, to be activated. The trigger mechanism can be of the flash type, in other words where the projection of the speckle pattern 14 and the image capture are performed instantaneously and simultaneously, or else of the delayed type, in other words where the image capture may be triggered—automatically or manually—over a time interval during which the projection is carried out continuously. This latter solution allows quick focusing of the image of the speckle pattern 14 projected onto the object 4 by back and forth movements of the apparatus 5.

The device 1 lastly comprises a unit 21 for processing the data coming from the sensor 17. In practice, this processing unit 21 takes the form of an on-board processor within the apparatus 5 or, as illustrated in FIG. 1, integrated into the central processor 22 of a remote computer 23 connected to the apparatus 5 via a wired or wireless communications interface, in which processor 21 a software application is implemented for construction of the digital images from the data coming from the sensor 17.

A method for constructing a digital image of a three-dimensional surface of a physical object 4 will now be described which implements the device 1 described hereinabove.

A surface 3 to be imaged is firstly chosen on the object 4, then the apparatus 5 is placed by orienting it such that the projector 8 is positioned facing this surface 3 and by directing the main optical axis 13 toward the latter (FIG. 1), at a distance estimated to be close to the distance allowing a sharp image of the speckle pattern 14 to be obtained (in other words the distance at which the reference plane Γ would normally be located).

Figure 6:
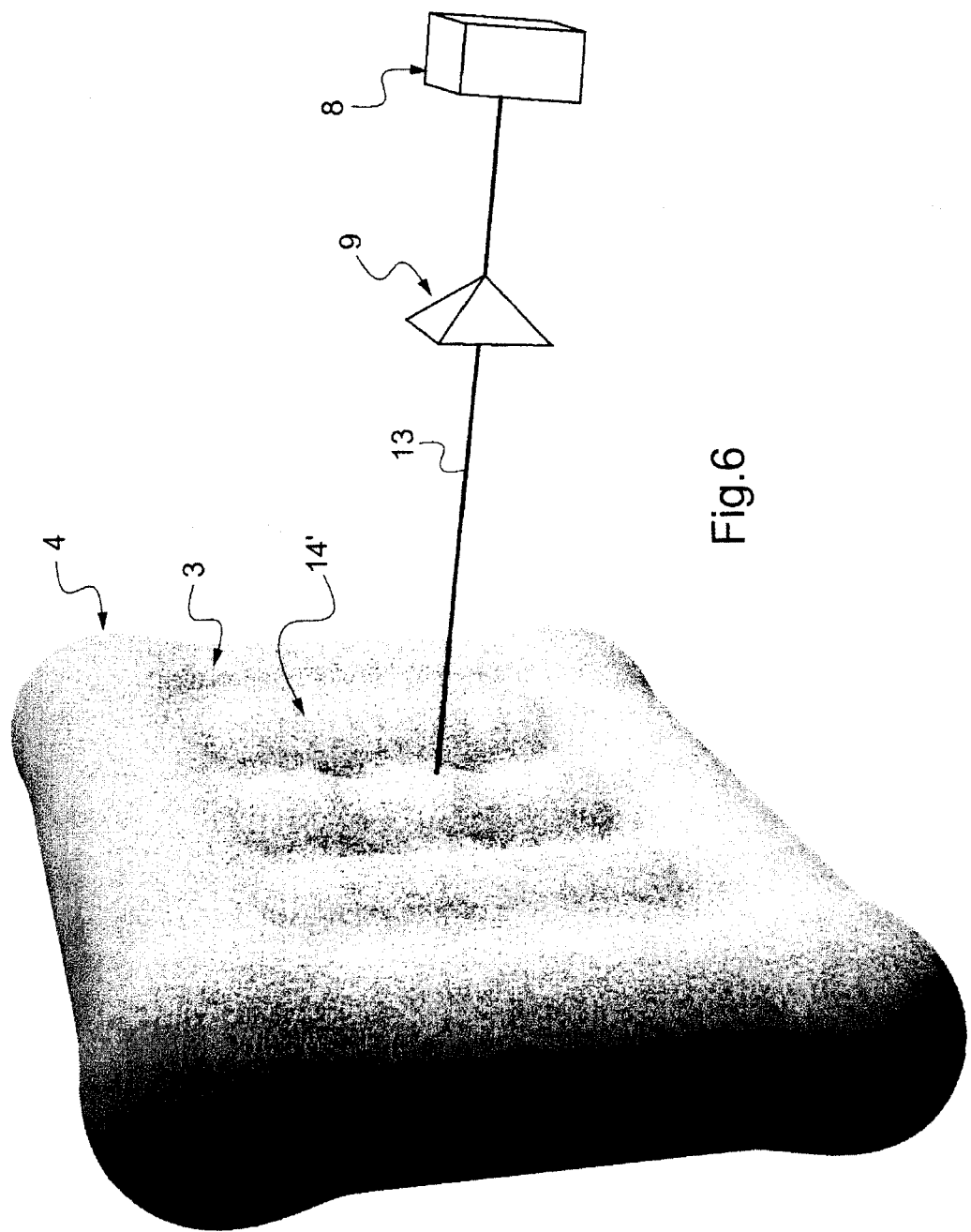
FIG. 6 is a schematic perspective view illustrating the projection, onto a front face of an object of the ergonomic pillow type, of the speckle pattern whose photographic acquisition allows a topography of the illuminated face to be carried out.

The trigger mechanism is then activated in order to project the image of the speckle pattern 14 from the mask 12 onto the surface 3 to be imaged, along the main optical axis 13. The image of the speckle pattern 14 on the object 4 exhibits at least locally, with respect to an image projected onto the reference plane, distortions due to the relief of the illuminated surface 3 (FIG. 6).

Figure 7:
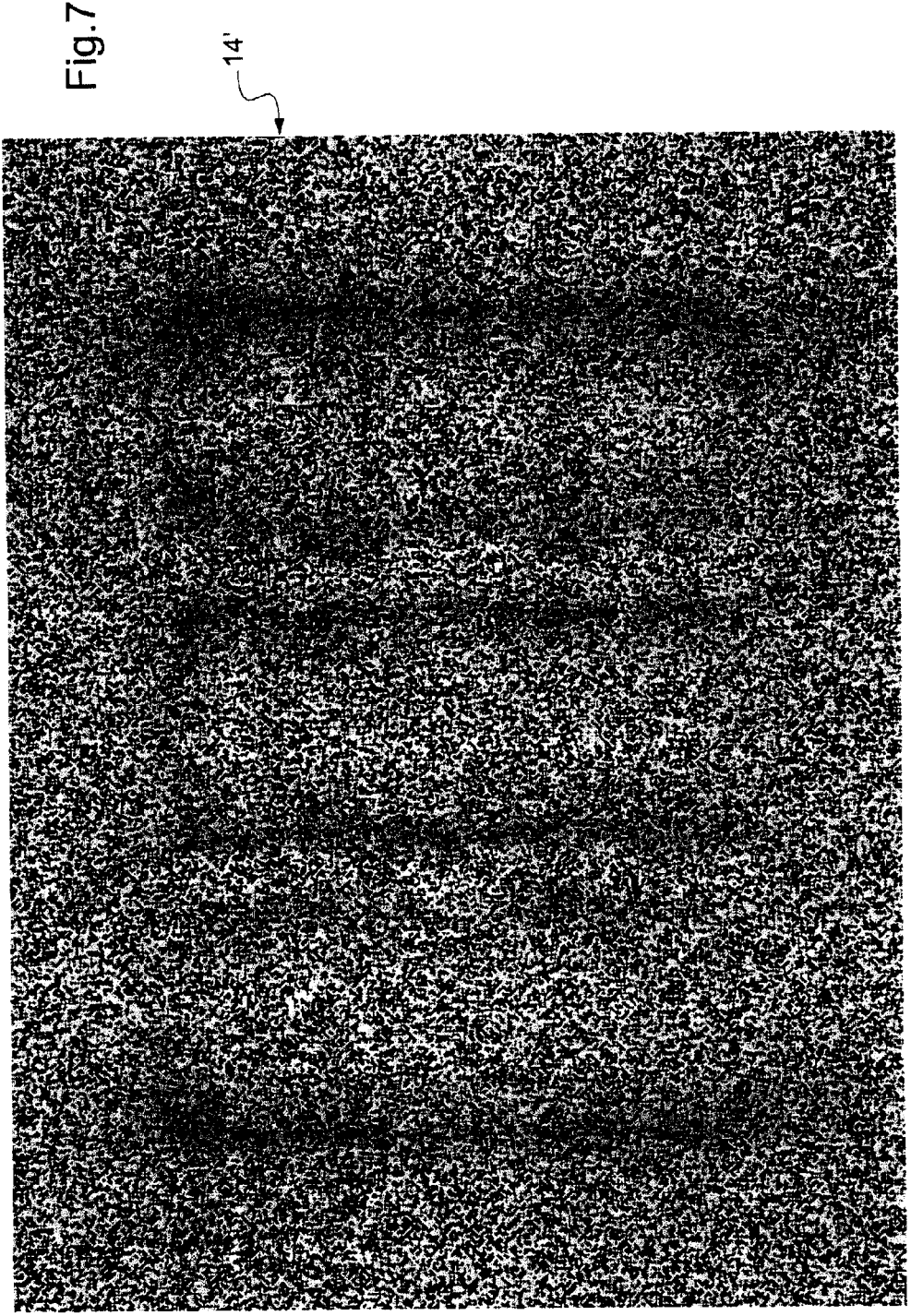
FIG. 7 is a plan view, in the axis of the sensing device, of the speckle pattern projected onto a face of the object in FIG. 6.

Whether it is performed simultaneously (flash) or in a delayed manner, the image capture is then carried out by means of the camera 9 in order to acquire and store the two-dimensional image of the speckle pattern 14' deformed by the illuminated surface 3 (FIG. 7), this image being successively reflected by the surface 3 of the object 4 and by the beam-splitter 20.

The following operation consists in comparing the image of the deformed speckle pattern 14' with the image of the non-deformed speckle pattern 14, as projected onto the reference plane Γ. This comparison can be carried out for each point of the speckle pattern 14, or on a selection of predetermined points, carried out within the non-deformed image.

In order to obtain a construction that is as accurate as possible, it is preferable for the comparison to be made for each point of the image, in other words for each pixel of the image acquired by the sensor 17. It goes without saying that the precision of the construction depends on the precision of the sensor 17. For a sensor 17 comprising around 9 millions pixels, the preferred design dimensions proposed hereinabove provide a precision of the order of a tenth of a mm, which is sufficient for constructing an acceptable digital image 2 of any type of object whose size is on the human scale.

The next operation consists in matching, for all the points selected, each point of the non-deformed speckle pattern 14 with the corresponding point of the deformed speckle pattern 14'.

For each point, this matching may be performed by correlation, in other words by trial-and-error within regions which, although exhibiting local disparities, appear similar in close regions of the two images.

Once each point has been matched, the deviation undergone by this point is measured, in other words, the shift in the image of the deformed speckle pattern 14' of the position of the point with respect to its position in the image of the non-deformed speckle pattern 14. Since each of these images is planar, this deviation is decomposed into a horizontal component (parallel to the abscissa axis) and a vertical component (parallel to the ordinate axis).

By a triangulation calculation carried out within the processing unit 21 using the data coming from the sensor 17, at least the depth coordinate of the point of the image of the deformed speckle pattern 14' corresponding to the point selected in the image of the non-deformed speckle pattern 14 can then be deduced from this.

Figure 4:
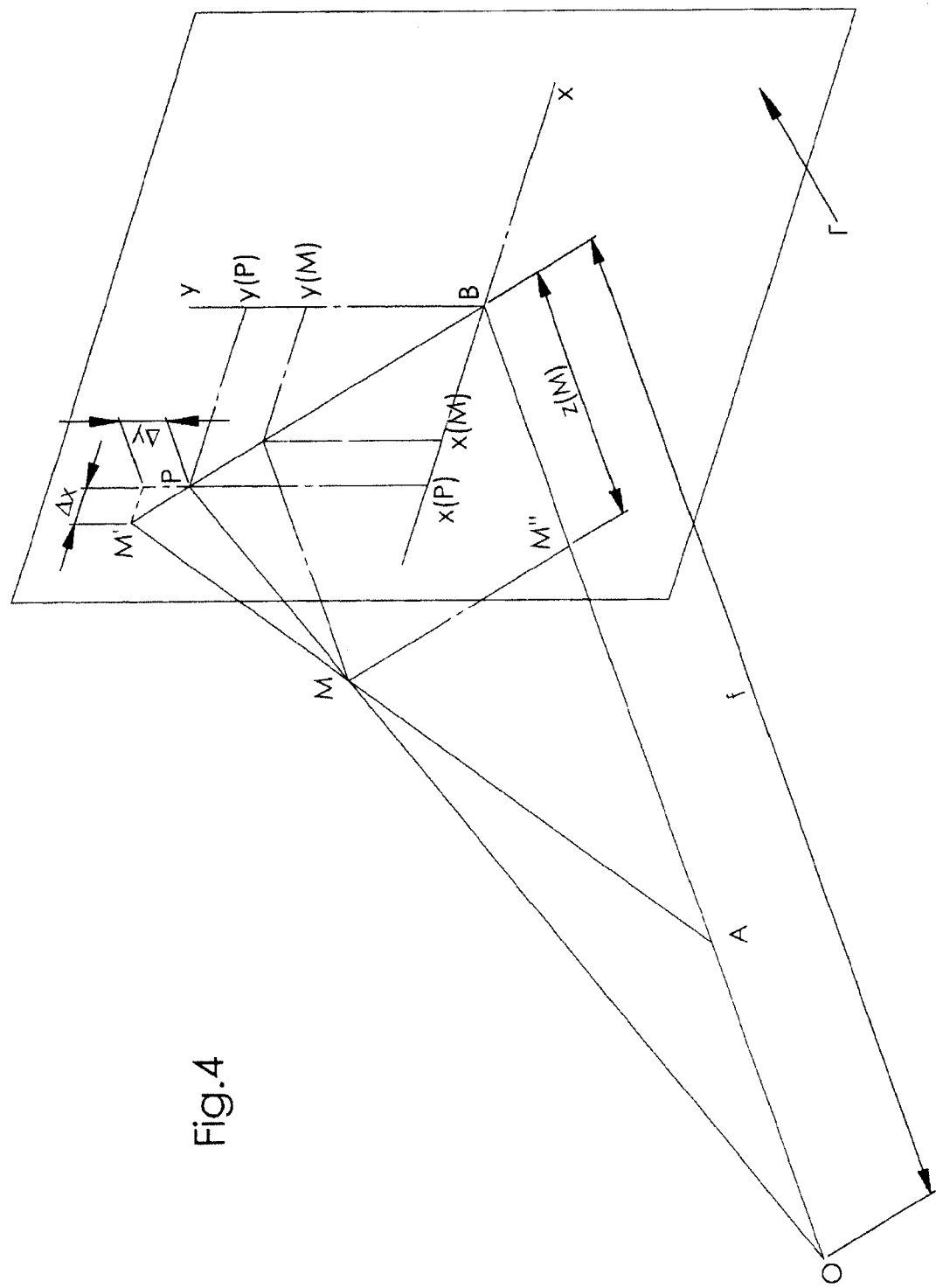
FIG. 4 is a schematic representation, in Euclidian geometry, of the mathematical model underlying the imaging technique according to the invention.

FIG. 4 illustrates the geometrical method employed for carrying out this calculation. In this mathematical representation, the main optical axis 13 and the secondary optical axis 16 are the same, in accordance with the arrangement described hereinabove.

The following notation is used:
Γ: reference plane;
P: point selected within the image of the speckle pattern as projected in the reference plane;
O: point of the mask whose image is the point P;
A: point of the sensor, image of the point P;
B: perpendicular projection (parallel to the optical axis) of the point O onto the reference plane;
M: image of the point P on the object;
M': projection of the point M onto the reference plane starting from the point A;
B,x,y,z: orthogonal system of Cartesian coordinates having B as origin in the reference plane;
x(P): abscissa of the point P in the system B,x,y,z
y(P): ordinate of the point P in the system B,x,y,z
x(M): abscissa of the point M in the system B,x,y,z
y(M): ordinate of the point M in the system B,x,y,z
z(M): depth of the point M in the system B,x,y,z
Δx=x(M')−x(P): horizontal component (abscissa) of the shift between M' and P;
Δy=y(M')−y(P): vertical component (ordinate) of the shift between M' and P.
M": projection of the point M onto the axis OB;
f: distance OB The reading of FIG. 4 is as follows. A light ray passing through the point O of the mask 12 hits the reference plane at the point P, image of the point O in this plane. When the object 4 is placed in its path, the same light ray hits the object at the point M, image of the point O on the object 4. The point A is, on the axis OB, the image of the point M on the sensor 17. Everything happens as if A were the image on the sensor 17 of the point M', an imaginary point defined mathematically as the projection of the point M starting from the point A and corresponding to the shift of the point P within the image of the speckle pattern, in the reference plane Γ.

The parameters f and AB are known; they depend on the structure of the device 1. The parameters x(P), y(P) may be calculated in a trivial manner by a simple translation, starting from a system of coordinates centered on the main optical axis 13, toward the system centered on the point B, the perpendicular projection of the point O in the reference plane Γ.

Once the matching has been carried out, in other words once the point M' has been detected by the aforementioned correlation method, the parameters Δx and Δy can be measured in the reference plane Γ. FIGS. 8 and 9 illustrate in grayscale the deviations Δx and Δy observed in the image of the speckle pattern owing to the distortion of the latter by its projection onto the object 4.

From the parameters thus known, calculated or measured, the depth coordinate z(M) of the point M, in other words the distance to the reference plane Γ of the image M on the object of the point O. This depth can accordingly be calculated by the following formula:

$$z(M) = \frac{\sqrt{(x(P)+\Delta x)^2 + (y(P)+\Delta y)^2} - \sqrt{x(P)^2 + y(P)^2}}{\frac{\sqrt{(x(P)+\Delta x)^2 + (y(P)+\Delta y)^2}}{AB} - \frac{\sqrt{x(P)^2 + y(P)^2}}{f}}$$

FIG. 10 illustrates a mapping of the depths calculated for each point of the image of the speckle pattern as projected onto the object 4.

Using the depth coordinate z(M) thus calculated, it is possible to calculate the abscissa x(M) and the ordinate y(M) of the point M in the system B,x,y,z, by means of the following formulae:

$$x(M) = \frac{\sqrt{x(P)^2 + y(P)^2}\left(1 - \frac{z(M)}{f}\right)}{\sqrt{1 + \frac{y(P)^2}{x(P)^2}}}$$

$$y(M) = \frac{\sqrt{x(P)^2 + y(P)^2}\left(1 - \frac{z(M)}{f}\right)}{\sqrt{1 + \frac{x(P)^2}{y(P)^2}}}$$

The coordinates of the point M in the reference plane, in a system centered on the optical axis 13, can be deduced from the coordinates x(M) and y(M) in a trivial manner by a simple translation in the reference plane Γ.

Based on the complete coordinates thus calculated for each point M, the processing software can then reconstruct the illuminated face 3 of the object 4 in the form of a digital image 2 illustrated in grayscale in FIGS. 11 to 15.

When a global construction of the object 4 is desired, the operations that have just been described are repeated for a plurality of adjacent surfaces of the object. The digital images of all of the imaged surfaces are then assembled, the overlap regions of two adjacent surfaces enabling, for example with the aid of an image correlation technique, a precise stitching of these surfaces along their edges.

The device 1 and the method described hereinabove offer a certain number of advantages.

Firstly, the simplicity and the compactness of the projector 8-camera 9 assembly allow an apparatus 5 to be produced that is sufficiently compact and light for portability and ease of handling.

Secondly, although the apparatus is equipped with only one camera 9, the prior acquisition of the non-deformed speckle pattern 14 projected onto the reference plane Γ makes available a second camera—albeit virtual—whose view provides a reference on the basis of which the comparisons are carried out that lead to the mapping of the three-dimensional surface 3 (in relief) to be imaged.

Thirdly, placing the camera 9 in the optical axis 13 of the projector 8—with the interposition of a beam-splitter 20—provides the benefit of the advantages of axial stereovision, in other words avoiding the obscuring phenomena that would be encountered if the camera 9 were angularly displaced with respect to the axis 13 of the projector 8, certain regions of the relief of the surface 3 to be imaged being effectively, in such a configuration, illuminated from the point of view of the projector but remaining shadowed from the point of view of the camera. For this reason, it is not necessary to take several shots of the same surface 3 since all of the points of the reference image (the non-deformed speckle pattern 14, such as projected in the reference plane Γ) are necessarily present in the image of the speckle pattern 14' projected onto the object, which at the same time benefits the precision, the simplicity of calculation and the speed of execution of the process. Working at a fixed focal length has however, with respect to conventional axial stereoscopy, minimizing the distortion phenomena associated with the magnification encountered in systems of this type (cf. on this point Catherine Deiherm, "*Reconstruction volumique dense par stéréovision axiale*" [Dense 3D reconstruction by axial stereovision], Thèse de doctorat [Doctoral thesis], Clermont Ferrand, 1995).

The invention claimed is:

1. A method for constructing a digital image of a three-dimensional surface of a physical object, this method comprising the operations consisting in:
    choosing a surface on the object;
    placing, facing said surface, a projector equipped with a light source, an optical axis, and a mask defining a speckle pattern comprising a multitude of points with predetermined light intensities and/or colors,
    directing the optical axis of the projector towards the surface to be imaged,
    projecting, along the optical axis, the speckle pattern onto the surface,
    acquiring and storing a two-dimensional image of the speckle pattern projected onto the surface and deformed by the latter, by means of an optical sensor disposed in the optical axis of the projector,
    comparing, for at least a selection of points from the speckle pattern, the image of the deformed speckle pattern with an image of the non-deformed speckle pattern, as projected onto a reference plane,
    calculating, for each point of the selection, at least the depth coordinate, measured parallel to the optical axis, of the projection of this point on the surface,
    wherein, in the calculation operation, the depth coordinate, defined as the distance between the projection of the point onto the object and the reference plane, is calculated by the following formula:

$$z(M) = \frac{\sqrt{(x(P)+\Delta x)^2+(y(P)+\Delta y)^2} - \sqrt{x(P)^2+y(P)^2}}{\frac{\sqrt{(x(P)+\Delta x)^2+(y(P)+\Delta y)^2}}{AB} - \frac{\sqrt{x(P)^2+y(P)^2}}{f}}$$

where:

P is the point selected within the image of the speckle pattern as projected in the reference plane, M is the image of the point P on the surface of the object;

B is the perpendicular projection, onto the reference plane, of the point in the mask corresponding to the point P, f is the distance between the mask and the reference plane, A is the image of the point M on the sensor;

x(P) and y(P) are, respectively, the abscissa and the ordinate of the point P within an orthogonal system linked to the reference plane, Δx and Δy are, respectively, the abscissa and the ordinate measurements, within the reference plane, of the deviation undergone by the point P owing to the deformation of the speckle pattern by the surface of the object.

2. The method as claimed in claim 1, in which the comparison operation comprises, for the selected points, the matching of each point of the non-deformed speckle pattern with the corresponding point of the deformed speckle pattern.

3. The method as claimed in claim 1, in which the comparison operation comprises the measurement, in the reference plane, and for each point selected, of the deviation undergone by the point owing to the deformation of the speckle pattern by the surface of the object.

4. The method as claimed in claim 1, in which the calculation operation comprises the calculation, in the reference plane, of the abscissa and of the ordinate of the point M, respectively using the following formulae:

$$x(M) = \frac{\sqrt{x(P)^2+y(P)^2}\left(1-\frac{z(M)}{f}\right)}{\sqrt{1+\frac{y(P)^2}{x(P)^2}}}$$

$$y(M) = \frac{\sqrt{x(P)^2+y(P)^2}\left(1-\frac{z(M)}{f}\right)}{\sqrt{1+\frac{x(P)^2}{y(P)^2}}}.$$

5. A method for construction of a digital image of a three-dimensional physical object, which comprises the construction of digital images of a plurality of adjacent surfaces of the object in accordance with the method as claimed in claim 1, and the assembly of the images of the surfaces thus constructed.

\* \* \* \* \*